United States Patent [19]
Oshima

[11] 3,872,488
[45] Mar. 18, 1975

[54] ELECTRONIC SHUTTER MEANS

[75] Inventor: Shigeru Oshima, Tokyo, Japan

[73] Assignee: Fuji Photo Film Co. Ltd., Nakanuma, Minami Ashigara-shi, Kanagawa, Japan

[22] Filed: June 4, 1974

[21] Appl. No.: 476,193

[30] Foreign Application Priority Data
June 4, 1973 Japan................................ 48-62683

[52] U.S. Cl.................. 354/246, 354/226, 354/242, 354/256
[51] Int. Cl........................... G03b 9/64, G03b 9/40
[58] Field of Search......................... 354/29, 48-51, 354/237, 238, 256, 241-247

[56] References Cited
UNITED STATES PATENTS
3,326,103  6/1967  Topaz............................... 354/50 X
3,664,245  5/1972  Bresson et al. ...................... 354/29

Primary Examiner—Fred L. Braun
Assistant Examiner—J. A. LaBarre
Attorney, Agent, or Firm—Sughrue, Rothwell, Mion, Zinn & Macpeak

[57] ABSTRACT

A guillotine type electronic camera shutter is provided with mechanical means, rather than electronic means, for shortening the exposure time by compensating for the delay in the electronic timing control circuit.

2 Claims, 7 Drawing Figures

ELECTRONIC SHUTTER MEANS

The present invention relates to a guillotine type electronic shutter means as employed in a photographic camera, and more particularly to an electronic shutter means wherein compensatory adjustment to control of relative movement of first and second curtains, and hence to exposure time, is effected mechanically rather than by resetting of an electronic shutter control circuit.

Figure 1:
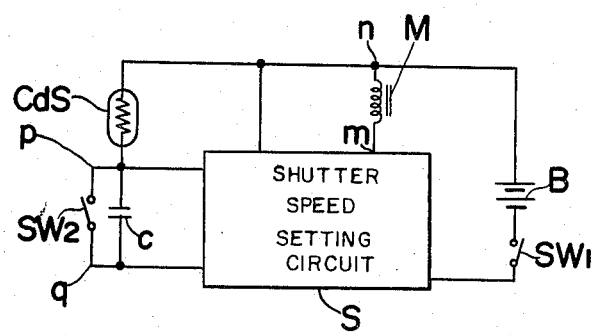

There are known numerous control means, most of which are electronic, for effecting automatic control of shutter opening time in response to ambient light conditions. The conventional basic circuit for electronic control means used in association with a guillotine type shutter is as shown in FIG. 1, and comprises a shutter speed setting circuit S, which is commonly built of IC elements, and which connects to a power supply source B through a normally open switch SW1, controls energization of an electromagnet M for retention of a shutter second curtain in a position to permit exposure of a film, and also connects to both plates of a capacitor C, to a normally open switch SW2 in parallel with the capacitor C, and to both plates of a light sensor such as a cadmium sulfide cell CdS, which is connected in series with the capacitor C, and is mounted externally to the camera, and positioned to receive light reflected from a scene being photographed. In this circuit, advantage is taken of the fact that the electrical resistance of the light sensor CdS varies in accordance with the amount of light incident thereon. The length of time the magnet M is maintained energized is dependent on the charge time of the capacitor C, and the charge time of the capacitor C depends on the resistance of the light sensor CdS, in other words, the length of time the magnet M is held energized varies according to the intensity of ambient light.

In taking a photograph with a camera incorporating shutter control means such as that shown in FIG. 1 action is as follows. Upon depression of a shutter button not shown, first, switch SW1 is closed, then both the shutter first curtain and shutter second curtain are moved to their cocked set positions, and this action is accompanied by simultaneous closure of the switch SW2, which effectively short circuits the capacitor C. Upon release of the shutter button, the first curtain is moved back to its normal position, while the second curtain is still retained in its set position by the magnet M, whereby an exposure opening formed in the first curtain comes into line with an exposure opening in the second curtain, and exposure of a film frame commences, and at the same time switch SW2 is opened. Switch SW2 now being opened, the capacitor C is brought into the circuit, and is charged at a rate which is dependent on the resistance offered by the light sensor CdS, i.e., on the amount of ambient light. When the charge on the capacitor reaches a certain set value, the speed setting circuit S de-energizes the electromagnet M, whereby the second curtain is released, and the exposure is terminated. By this means the exposure times in taking different photographs vary in accordance with the amount of available light.

The abovedescribed shutter speed control means is very effective in principle, but in practical circuits there are delays, which may result in the second curtain being released after a longer time than actually required to effect correct exposure of a film. Such delays can be particularly troublesome when combined with effects of remnant magnetism in the electromagnet for retention of the 2nd curtain, and therefore, in order to ensure accurate timing in conventional electronic shutter speed control circuits, it is usual to include a delay compensation circuit. This, however, has the disadvantage that the circuitry as a whole is rendered more complex, and so more liable to cause trouble, and is also more costly.

It is accordingly an essential object of the present invention to provide an electronic shutter means in a camera employing a guillotine type shutter wherein delay compensation for a timing control circuit is effected by a mechanical means, whereby the shutter means is rendered simpler in construction and lower in cost.

In achieving this and other objects, there is provided, according to the present invention, an electronic shutter means, wherein a first curtain comprises a projection portion which contacts a second curtain, and moves the second curtain to a cocked set position, when the first curtain is moved to a cocked position by a cocking means upon depression of a shutter button. An exposure opening in the first curtain is normally in line with the optical axis of the camera lens, but is moved out of line therewith when the first curtain is cocked. An exposure opening in the second curtain is normally out of line with the camera lens optical axis, but is moved into line therewith when the second curtain is cocked. When moved to the cocked position, the first curtain is engaged by a spring clamp means. When the shutter button is released and the cocking means starts to move back to its original position, the first curtain does not immediately move, since it is retained by the clamp means, a holding electromagnet is energized to retain the second curtain in a cocked position, and at the same time a capacitor in series with a light sensor, which receives light reflected from the scene being photographed, and controls the charge rate of the capacitor, is brought into the shutter speed control circuit. Thus, at this stage, operation of the speed control circuit commences, but exposure of a film frame has not yet started, whereby an allowance for delays in the control circuit is made. After travelling back a certain distance towards its original position, the cocking means strikes a projection on the first curtain, whereby the 1st curtain is disengaged from the spring clamp means, and moves back to its original position, the exposure openings of the first and second curtains thus being brought into alignment, to permit exposure of a film frame. After a lapse of time determined by the amount of ambient light, as indicated by the time required for the charge on the capacitor in series with the light sensor to reach a certain value, the shutter speed control circuit de-energizes the holding electromagnet, whereby the second curtain is released and returns to it original position, and the exposure is terminated.

Figure 5:
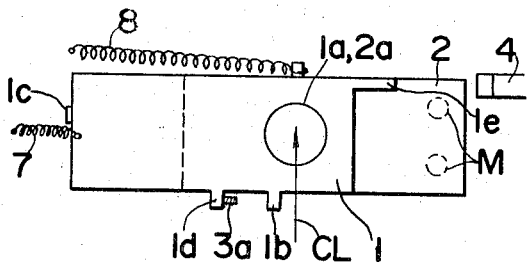
Figure 6:
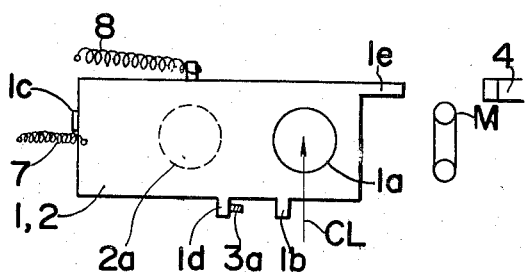
Figure 2:
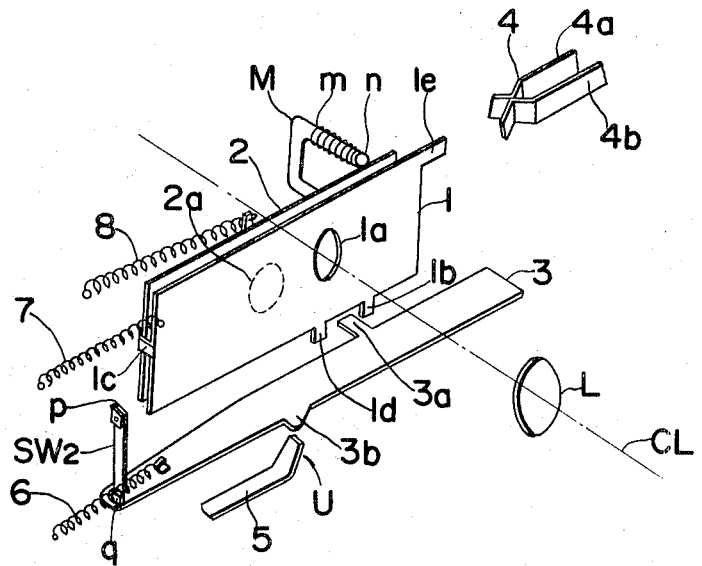
Figure 7:
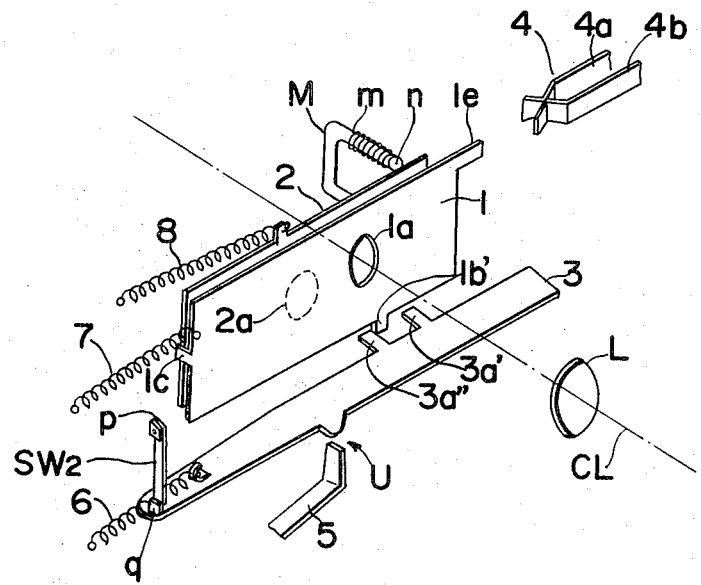

These and other objects and features of the present invention will become apparent to those skilled in the art from the following description taken in conjunction with the preferred embodiments thereof shown in the accompanying drawings, in which;

FIG. 1 is a basic electric circuit diagram of a control circuit for an electronically controlled shutter of conventional type, FIG. 2 is a perspective view of main parts of a shutter means according to a first embodiment of the present invention, FIGS. 3 through 6 are explanatory drawings illustrating successive stages of the action of a shutter means shown in FIG. 2, and FIG. 7 is a perspective view showing main parts of a shutter means according to a second embodiment of the present invention.

Referring to FIG. 2, there is shown a shutter means associable with shutter timing control circuitry in which terminals n, m and p, q of the electromagnet M and switches SW2 in FIG. 2 correspond to and are connected with the corresponding terminals n, m and p, q of the circuitry in FIG. 1, such as the abovedescribed circuitry shown in FIG. 1, and comprising a first curtain 1 and a second curtain 2, in which are formed exposure openings 1a and 2a, respectively. The first curtain 1 and second curtain 2 are respectively loaded by compression springs 7 and 8, each of which is suitably attached at one end to a camera side wall portion, and at the other end to the respective curtain, and which normally, i.e., when the shutter is not actuated, hold the first and second curtains 1 and 2 in positions wherein the first curtain opening 1a is in line, and the second curtain opening 2a is out of line with the optical axis CL of a camera lens L, through which light to expose a film is directed. At one side edge of the first curtain 1 attached to the spring 7, that is, the left-hand edge thereof as seen from the lens L, there is an integrally attached, rearwardly projecting tab 1c, which contacts the left-hand edge of the second curtain 2. At the lower edge of the first curtain 1, and to the right of the centre thereof, there are two integrally attached, downwardly extending pins 1b and 1d, which are contactable by a push extension 3a of a cocking plate 3, described below, there being a space between the pins 1b and 1d into which the push extension 3a is loosely inserted, and the pin 1b being nearer the right-hand edge of the first curtain 1. Extending from the upper right-hand corner of the 1st curtain 1, at the opposite side of the tab 1c, there is an integrally formed engagement piece 1e. To the right of the first curtain 1, and in line with the engagement piece 1e, there is provided a clamp retainer 4 comprising two spring plates 4a and 4b, whose spring force inclines each towards the other, and each of whose right-hand end is fixedly attached to a camera side wall portion, and whose left-hand end forms a bent portion curved towards the other spring plate, whereby the left-hand ends of the plates 4a and 4b are normally held in firm contact, and are pressed towards one another with sufficient force to counter the force of the springs 7 and 8 attached to the first and second curtains 1 and 2. When the shutter is cocked, in a manner described below, the engagement extension 1e is pushed between the ends of the plates 4a and 4b, whereby the first curtain 1 is held by the clamp 4. To the rear of the second curtain there is provided an electromagnet M, which is energizable by a shutter timing control circuit S as shown in FIG. 1 to retain the second curtain in a cocked position.

The cocking plate 3 is constituted by a long plate, which is provided horizontally, slightly below and slightly in front of the lower edge of the first curtain 1, and sufficiently close thereto for the abovementioned push extension 3a, which extends rearwardly from the plate 3 to contact the pin 1b or pin 1d of the 1st curtain 1. The cocking plate 3 is normally held in a leftmost position by a suitably attached compression spring 6, and is connected in a suitable manner to a shutter button mechanism, not shown, which moves the plate 3 in a conventionally known manner to a rightmost set position when the shutter button is depressed. The left-hand end of the cocking plate 3 is in connection to the normally open switch SW2, which is associated with the shutter timing control circuit S, and is connected in parallel to the capacitor C in series with the light sensor CdS as shown in FIG. 1. The switch SW2 remains open at all times, except when the cocking plate 3 is in the rightmost set position to which it is moved due to depression of the shutter button. The cocking plate 3 further comprises a forwardly extending lock projection 3b, which is engageable by a pivotally mounted lock lever 5 shiftable with the shutter button. At the same time as the shutter button is depressed and the plate 3 is moved to the set position, the lock lever 5 is swung towards the cocking plate 3 in the direction indicated by the arrow U in FIG. 2, and brought into engagement with the lock projection 3b, whereby the cocking plate 3 is held in the rightmost set position. When the shutter button is released, the lock lever 5 is swung out of engagement with the lock projection 3b, and the cocking plate 3 is drawn leftwards, back to its normal position, by the spring 6.

Referring now to FIG. 1 and to FIGS. 3 through 6, the abovedescribed shutter means functions as follows. Simultaneously with depression of the shutter button, the cocking plate 3 is moved rightwards, and the push projection 3a thereof pushes the right-hand pin 1b at the bottom of the first curtain 1, which is therefore moved rightwards, against the force of the spring 7, and at the same time moves the second curtain 2 also rightwards, against the force of the spring 8, due to the contact of the tab 1c with the left-hand edge of the second curtain 2.

Figure 3:
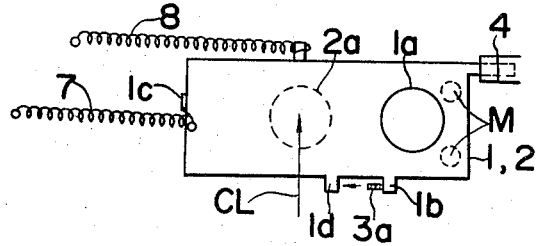

In FIG. 3, when the cocking plate 3, and hence the first and second curtains 1 and 2 have been moved to rightmost positions, and while the shutter button still remains depressed, the cocking plate 3 is held by the lock lever 5, the first curtain exposure opening 1a is out of line with the lens optical axis CL, and the second curtain exposure opening 2a is in line therewith. As well as being held by the cocking lever 3, the first curtain is now engaged by the clamp retainer 4. Also, at this stage, the electromagnet M is energized to hold the second curtain 2 in a cocked position, independently of the first curtain 1. the electromagnet M remains energized until the capacitor C has been charged to a certain value. Charging of the capacitor C does not yet start, however, since the switch SW2 is now closed, and bypasses the capacitor C.

Figure 4:
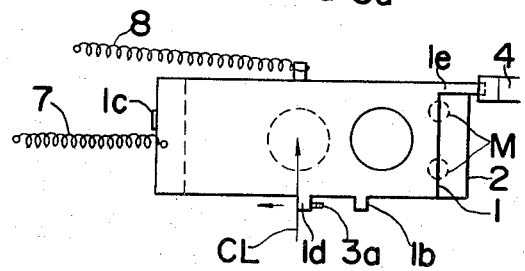

In FIG. 4, when the shutter button is released, the cocking plate 3 is disengaged by the lock lever 5 and starts to move leftwards back to its original position, whereupon the switch SW2 is opened, and the capacitor C is brought into the control circuit and starts to be charged at a rate dependent on the resistance offered by the light sensor CdS. The first curtain 1, although no longer held by the cocking lever 3, remains held in a cocked position by the clamp retainer 4 until the cocking lever 3 has moved a distance equal to the spacing between the pins 1b and 1d at the lower edge of the first curtain 1, and the push extension 3a thereof strikes the pin 1d, whereupon the first curtain 1 is disengaged from the clamp retainer 4 and starts to move leftwards. In other words, charging of the capacitor C, and thus control circuit action determining shutter opening time, is allowed to start before release of the first curtain 1. At this time, even though not held by the first curtain 1, the second curtain 2 is retained in a cocked position by the electromagnet M.

In FIG. 5, when the first curtain 1 reaches its normal, leftmost position, the exposure opening 1a thereof is brought into line with the exposure opening 2a of the second curtain 2 and exposure of a film commences. After the charge on the capacitor C has reached a certain value, the control circuit S de-energizes the electromagnet M, where-upon the second curtain 2 is moved leftwards by the spring 8, and the exposure opening 2a thereof is moved out of alignment with the first curtain opening 1a, the exposure of the film thus being terminated, and the first and second curtains 1 and 2 being returned to their normal, unactuated positions, as shown in FIG. 6.

In a second embodiment of the invention shown in FIG. 7, the first curtain 1 comprises only a single pin 1b' at the lower edge thereof, and the cocking plate 3 comprises two spaced push projections 3a' and 3a'' extending rearwardly therefrom the pin 1b' lying between the push projections 3a' and 3a''. The first curtain 1 is moved into a cocked position by the push projection 3b'' pushing the pin 1b', and is moved out of engagement with the retainer 4 by the other push projection 3b' striking the pin 1b'. Otherwise the construction and action of this shutter means are the same as described in reference to the first embodiment.

As is clear from the above description an electronic shutter means according to the invention eliminates the necessity for a separately provided electronic delay compensation circuit by the provision of an extremely simple, built-in delay compensation means, providing with a certain distance for delaying the movement of the first curtain at a certain time after the movement of the cocking means and is thus less complex and more economical in construction.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. In a guillotine type electronic shutter comprising a first curtain, a cocking means, which, when moved to set position, moves said first curtain to a cocked position, a second curtain, which is moved to a cocked position by said first curtain, and an electromagnetic means, which is actuated by an electronic shutter control circuit to temporarily retain said second curtain in a cocked position upon return of said cocking means from said set position, an electronic shutter means comprising a clamp means, which may engage said first curtain when said first curtain is moved to said cocked position, and retain said first curtain in said cocked position upon start of return of said cocking means from said set position, and a mechanical means, which is provided between said first curtain and said cocking means, and which is actuated to forcibly disengage said first curtain from said clamp means, after said cocking means has returned a certain distance from said set position, whereby exposure time determined by said control circuit is shortened by a certain time.

2. An electronic shutter means as defined in claim 1, wherein said mechanical means comprises a projection provided on said first curtain which is struck by a cocking means after travelling back a certain distance towards its original position, whereby the first curtain is disengaged from the spring clamp means, and moves back to its original position, the exposure openings of the first and second curtains thus being brought into alignment, to permit exposure of a film frame.

* * * * *